(12) United States Patent
Urata et al.

(10) Patent No.: US 9,391,698 B1
(45) Date of Patent: Jul. 12, 2016

(54) SYSTEMS AND METHODS FOR ACHIEVING IMPROVED EYE SAFETY OF AN OPTICAL TRANSCEIVER

(71) Applicant: Google Inc., Mountain View, CA (US)

(72) Inventors: Ryohei Urata, Mountain View, CA (US); Nathan Folkner, Mountain View, CA (US); Zuowei Shen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 14/061,503

(22) Filed: Oct. 23, 2013

(51) Int. Cl.
| *H04B 10/08* | (2006.01) |
|---|---|
| *H04B 10/00* | (2013.01) |
| *H04B 10/077* | (2013.01) |
| *H04B 10/035* | (2013.01) |
| *H04B 10/073* | (2013.01) |

(52) U.S. Cl.
CPC .......... *H04B 10/0779* (2013.01); *H04B 10/035* (2013.01); *H04B 10/073* (2013.01)

(58) Field of Classification Search
CPC .................................................. H04B 2210/08
USPC .......................................................... 398/151
See application file for complete search history.

(56) References Cited

U.S. PATENT DOCUMENTS

| 6,373,621 | B1 * | 4/2002 | Large ...................... H01S 3/302 359/334 |
|---|---|---|---|
| 6,594,043 | B1 * | 7/2003 | Bloom et al. .................... 398/15 |
| 6,724,993 | B2 * | 4/2004 | Koike et al. ........................ 398/9 |
| 6,897,424 | B2 * | 5/2005 | Suzuki .......................... 250/205 |
| 7,092,630 | B2 * | 8/2006 | Cunningham ..... H04B 10/0799 385/18 |
| 7,184,621 | B1 * | 2/2007 | Zhu ................................ 385/24 |
| 7,440,698 | B2 * | 10/2008 | Barker ................. H04B 10/077 398/197 |
| 7,529,488 | B2 * | 5/2009 | Burdick et al. ............... 398/137 |
| 7,864,389 | B2 * | 1/2011 | Muzicant ............... H04B 10/03 359/33 |
| 2002/0149810 | A1 * | 10/2002 | Brown et al. ................. 359/110 |
| 2003/0002109 | A1 * | 1/2003 | Hochberg et al. ............. 359/152 |

(Continued)

*Primary Examiner* — Ken N Vanderpuye
*Assistant Examiner* — Jai Lee
(74) *Attorney, Agent, or Firm* — John D. Lanza; Foley & Lardner LLP (57) ABSTRACT

Systems and methods for achieving eye safety of an optical transceiver are provided. An optical module can be configured to output a first optical signal. A first photodetector can be configured to output a signal indicative of a presence or absence of a second optical signal. A controller can be coupled to the optical module and the first photodetector and can be configured to control the output of the optical module. In response to a determination that an output of the first photodetector indicates the second optical signal is absent, the controller can control the optical module to output the first signal at a decreased average optical power. In response to a determination that an output of the first photodetector indicates the second optical signal is present, the controller can control the optical module to output the first signal at an increased average optical power.

27 Claims, 8 Drawing Sheets

(56) References Cited

U.S. PATENT DOCUMENTS

| | | | |
|---|---|---|---|
| 2003/0095303 A1* | 5/2003 | Cunningham | H04B 10/0799 398/140 |
| 2003/0128411 A1* | 7/2003 | Aronson | G01M 11/00 398/139 |
| 2008/0205900 A1* | 8/2008 | Cole | H04L 43/0817 398/153 |
| 2008/0247752 A1* | 10/2008 | Wang | H04B 10/07955 398/22 |
| 2008/0267620 A1* | 10/2008 | Cole | H04B 10/0775 398/17 |
| 2008/0285980 A1* | 11/2008 | Nguyen | 398/141 |
| 2009/0060520 A1* | 3/2009 | Cole et al. | 398/140 |
| 2010/0067901 A1* | 3/2010 | Mizutani | H04B 10/03 398/20 |
| 2010/0329669 A1* | 12/2010 | Cunningham | H04B 10/40 398/41 |
| 2011/0148519 A1* | 6/2011 | Drogi et al. | 330/129 |
| 2011/0280582 A1* | 11/2011 | Piehler | 398/117 |
| 2012/0045202 A1* | 2/2012 | Jiang | H04B 10/40 398/38 |
| 2012/0119661 A1* | 5/2012 | Muller | F21K 9/00 315/158 |
| 2013/0049778 A1* | 2/2013 | Yang et al. | 324/714 |

* cited by examiner

SYSTEMS AND METHODS FOR ACHIEVING IMPROVED EYE SAFETY OF AN OPTICAL TRANSCEIVER

BACKGROUND

An optical transceiver can include a laser for transmitting light. Some transceivers also include a lens that collimates the light into a beam. When a transceiver is connected to a fiber optic cable, the light from the transceiver is directed through the lens and into the fiber optic cable. However, if the cable is disconnected, light can escape from the transceiver and the eyes of a user or bystander can be exposed to the laser light. The optical power required for transmitting light in a transceiver, when collimated through the lens, can be harmful to the eye, resulting in such transceivers being assigned relatively high laser eye safety classifications. Individuals who install or repair such a transceiver are therefore required to wear safety goggles, receive training, and undergo periodic eye examinations.

SUMMARY OF THE INVENTION

Aspects and implementations of the present disclosure are directed to systems and methods for achieving improved eye safety of an optical transceiver.

At least one aspect is directed to an optical transceiver. The transceiver can include an optical module configured to output a first optical signal. The transceiver can include a first photodetector configured to output a signal indicative of a presence or absence of a second optical signal. The transceiver can include an electronic processor coupled to the optical module and the first photodetector, and configured to control the output of the optical module. In response to a determination that an output of the first photodetector indicates the second optical signal is absent, the electronic processor can control the optical module to output the first signal at a decreased average optical power. In response to a determination that an output of the first photodetector indicates the second optical signal is present, the electronic processor can control the optical module to output the first signal at an increased average optical power.

At least one aspect is directed to a method for operating an optical transceiver. The method includes outputting, by a photodetector of the optical transceiver, a signal indicative of a presence or absence of a first optical signal. The method includes outputting, by the optical transceiver, a second optical signal at a decreased average optical power, responsive to a determination that the first optical signal is absent. The method includes outputting, by the optical transceiver, the second optical signal at an increased average optical power, responsive to a determination that the first optical signal is present.

At least one aspect is directed to an optical transceiver. The transceiver can include a light outputting means for outputting a first optical signal. The transceiver can include a light detecting means for outputting a signal indicative of a presence or absence of a second optical signal. The transceiver can include a signal analyzing means for analyzing the signal output by the light detecting means. The transceiver can include a signal controlling means. The signal controlling means can be configured to control the light outputting means to output the first optical signal at a decreased average optical power, responsive to a determination by the signal analyzing means that the output of the light detecting means indicates the second optical signal is absent. The signal controlling means also can be configured to control the light outputting means to output the first optical signal at an increased average optical power, responsive to a determination by the signal analyzing means that the output of the light detecting means indicates the second optical signal is present.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, systems and methods for achieving eye safety of an optical transceiver. The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
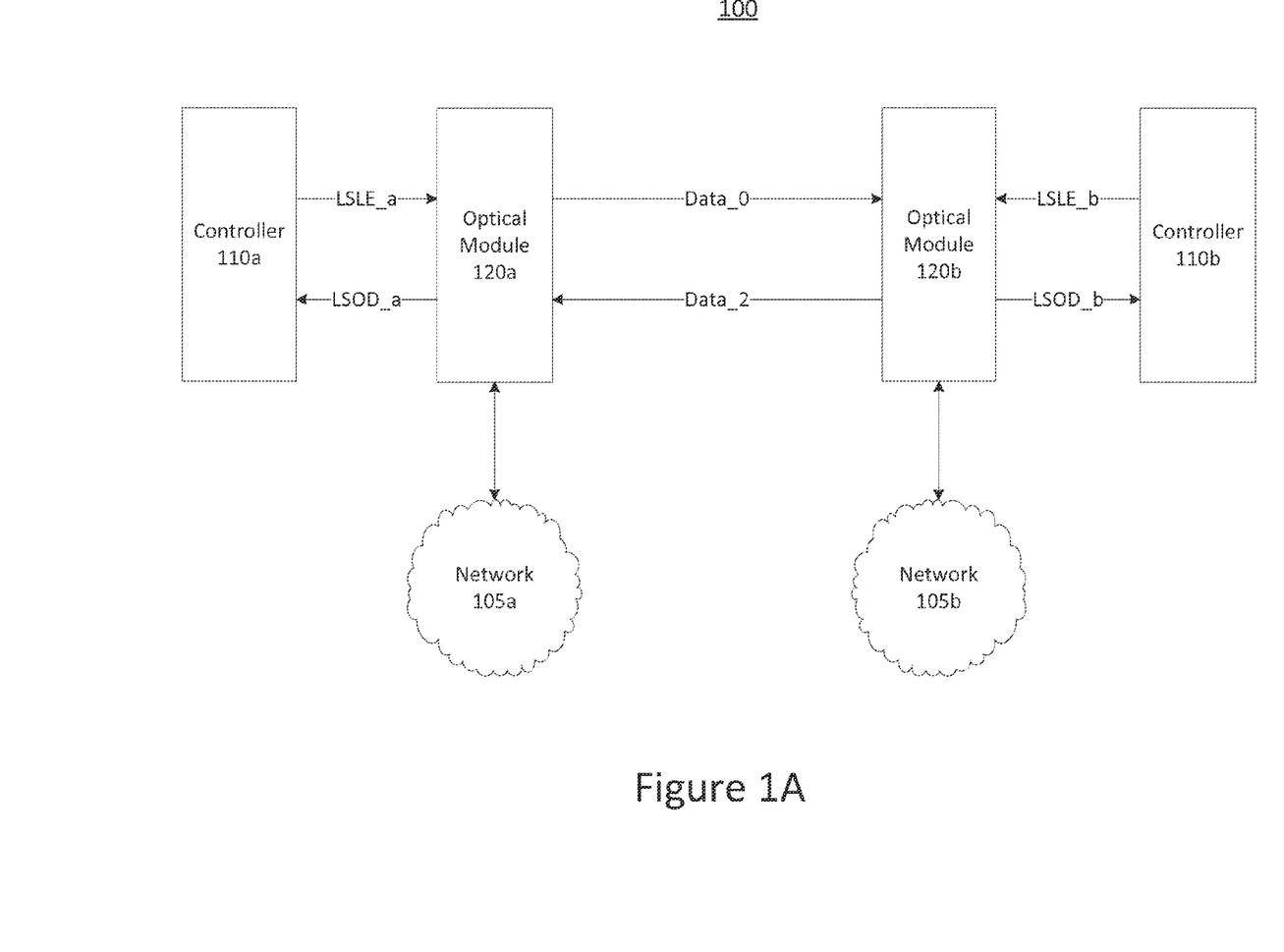
FIG. 1A is a block diagram of an example optical link, according to an illustrative implementation.

FIG. 1A is a block diagram of an example optical link 100, according to an illustrative implementation. The optical link 100 can be used to reduce the risk of eye damage to an individual who is exposed to light sources of the optical link 100. The optical link 100 can represent a communication channel of a computer network. For example, computing devices included in a first network 105a can communicate with computing devices in a second network 105b via the optical link 100. The optical link 100 includes a first controller 110a in communication with a first optical module 120a. A second controller 110b communicates with a second optical module 120b. Network data, such as data from the networks 105a and 105b, can be exchanged between the first optical module 120a and the second optical module 120b.

The networks 105a and 105b can include computer networks such as portions of the Internet, personal, local, metro, wide or other area networks, intranets, satellite networks, and other communication networks such as voice or data mobile phone communication networks. In some implementations, the networks 105a and 105b can include servers in one or more data centers, and the optical link 100 can represent a communication channel within or between the data centers. For example, the optical modules 120a and 120b can be included in network interface cards of respective servers in the data centers or in various switches, hubs, or routers incorporated into the data centers.

The optical module 120a is configured to output an optical signal, shown as "Data 0" in FIG. 1A, to the optical module 120b. The optical module 120b outputs an optical signal shown as "Data_2," which is received by the optical module 120a.

In some implementations, the optical signals Data_0 and Data_2 are transmitted over fiber optic cables connected to respective input and output ports of the optical modules 120a and 120b. For example, the optical modules 120a and 120b can each include a controllable light source for generating and optical signal, as well as a light detector for receiving an optical signal. In some implementations, the Data_0 and Data_2 signals are carried by a single fiber optic cable. The optical signals Data_0 and Data_2 generated by the optical modules 120a and 120b, respectively, may be harmful to a human eye when the eye is exposed to the optical signals. For example, the optical power required to reliably transmit information between the optical module 120a and 120b may be relatively high to compensate for dispersion effects and optical noise within the fiber optic cable or electrical noise at the receiver/light detector. If the fiber optic cable carrying the Data_0 signal is disconnected from the input port of the optical module 120b, individuals in the vicinity of the optical link 100 can be exposed to the light forming the Data_0 signal that escapes from the end of the fiber optic cable, and the high optical power of the light may cause damage to the eyes of the individuals. A similar problem occurs when the fiber optic cable carrying the Data_2 signal is disconnected from the optical module 120a, allowing light to escape from the optical link 100.

To reduce the risk of eye damage, the controllers 110a and 110b can implement control algorithms that prevent their respective optical modules 120a and 120b from outputting unsafe light levels in circumstances in which individuals potentially might be exposed to harmful light that has escaped from the optical link 100 (e.g., due to a disconnected fiber optic cable). The controller 110a receives an optical detection signal, shown as LSOD_a, from the optical module 120a and outputs an enable signal, shown as LSLE_a, that is received by the optical module 120a. Likewise, controller 110b receives the optical detection signal LSOD_b from the optical module 120b and outputs the enable signal LSLE_b, which is received by the optical module 120b. In some implementations, the respective LSLE and LSOD signals are digital signals whose voltages correspond to logic levels. The details of the algorithm implemented by the controllers 110a and 110b is described further below in connection with FIGS. 1B and 1C.

Figure 1B:
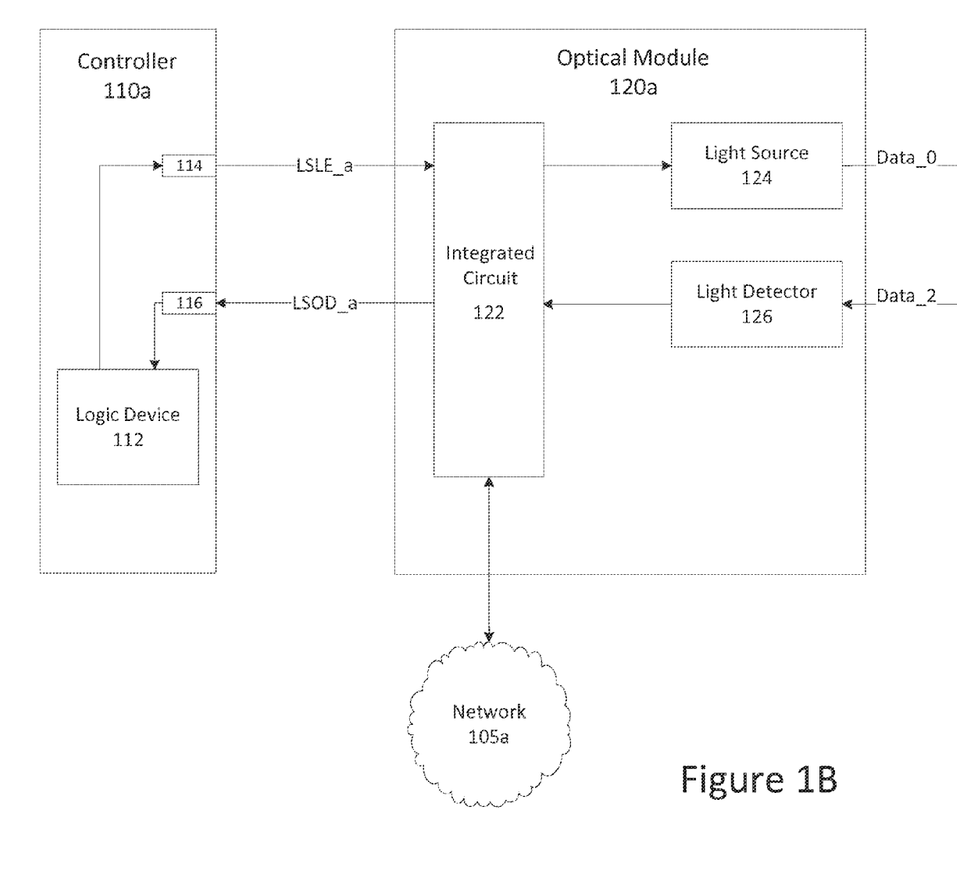
FIG. 1B is a block diagram showing a controller and an optical module of the optical link shown in FIG. 1A, according to an illustrative implementation.

FIG. 1B is a block diagram showing a controller 110a and an optical module 120a of the optical link 100 shown in FIG. 1A, according to an illustrative implementation. However, it should be appreciated that the controller 110b and the optical modules 120b include features similar to those shown in FIG. 1B. The controller 110a includes a logic device 112, an output interconnect 114, and an input interconnect 116. The logic device 112 receives the LSOD_a input signal from the input interconnect 116. Based on the LSOD_a signal, the logic device 112 generates a voltage corresponding to the LSLE_a signal and outputs the voltage on the output interconnect 114. In some implementations, the logic device 112 may be implemented as special purpose logic circuitry, such as a field programmable gate array (FPGA) or an application-specific integrated circuit (ASIC). In other implementations, the logic device 112 may be one or more general purpose processors configured to perform the processes disclosed herein by executing computer readable instructions stored on a computer readable medium.

The optical module 120a includes an integrated circuit 122, a light source 124, and a light detector 126. The integrated circuit 122 can communicate with the network 105a, for example to receive network packets to be transmitted to another network node by the optical module 120a or to forward network packets intended for nodes on the network 105a. For example, the integrated circuit 122 may include, or may be communicatively coupled to, a network interface card (NIC), or any other interface device configured to transmit and receive information to and from the network 105a. The integrated circuit 122 controls the light source 124 to output the optical Data_0 signal, which can be transmitted to another optical module such as the optical module 120b shown in FIG. 1A. In some implementations, the light source 124 is a laser whose output can be controlled to correspond to the information encoded in the Data_0 signal. Suitable lasers include typical semiconductor lasers found in traditional fiber optic communication devices. The light source 124 can also include lenses or other focusing devices to collimate light. Such collimation increases the efficiency with which the optical signal is coupled into a fiber optic cable, but increases the risk to the human eye. The integrated circuit 122 controls the light source 124 to generate the Data_0 signal. In some implementations, the light source 124 is capable of outputting an optical signal, which, particularly when collimated through a lens, has a high average optical power that may harm the eyes of an individual whose eyes are exposed to the optical signal.

The integrated circuit 122 can use the LSLE_a signal as an enable input for the light source 124. For example, when the LSLE_a signal has a logical high value, the integrated circuit 122 can control the light source 124 to transmit network data to the optical module 120b via the Data_0 signal. The Data_0 signal can correspond to network packets received from the network 105a or other network information generated by the integrated circuit 122. A high optical power may be required for successful transmission of network data from the optical module 120a to the optical module 120b. Thus, when the LSLE_a signal has a logical high value, the processor can control the light source 124 to output light that may cause harm to an individual's eyes if they were exposed to the light.

However, when the LSLE_a signal has a logical low value, the integrated circuit 122 can respond by turning off the light source 124. That is, a logical low value of the LSLE_a signal can cause the integrated circuit 122 to disable the light source 124. In some implementations, the LSLE_a signal also can be modulated. The integrated circuit 122 can respond to the modulation of the LSLE_a signal by controlling the light source 124 to modulate the light output. In some implementations, the modulation pattern of the light source 124 can be configured to achieve a desired average optical power output of the light source 124. For example, the light source 124 can be modulated to reduce the pulse width or duty cycle of the output of the light source 124, so that the light output is safe for a human observer whose eyes are exposed to the light output. In some other implementations, in response to a low LSLE_a signal, the integrated circuit 122 causes the light source 124 to output a modulation pattern without the need for the LSLE_a signal to be modulated.

The light detector 126 receives an optical input signal, such as the Data_2 signal generated by the optical module 120*b* shown in FIG. 1A. The light detector 126 can detect a presence or absence of the Data_2 signal, and transmits a signal corresponding to this presence or absence to the integrated circuit 122. For example, the light detector 126 can output a digital signal to the integrated circuit 122, with a logical high voltage indicating that the Data_2 signal is present and a logical low voltage indicating that the Data_2 signal is absent. This information can become the LSOD_a signal or can be used by the integrated circuit 122 to generate the LSOD_a signal. In some other implementations, the light detector 126 is configured to generate the LSOD_a signal (or another signal used as data to inform the generator of the LSOD_a signal), based on the presence or absence of another out-of-band optical signal received over the optical link. In some other implementations, the light detector 126 or the integrated circuit 122 outputs the LSOD_a signal based on a low-pass filtered version of the signal generated by the light detector 126 in response to the receipt of the Data_2 signal.

In some implementations, the light detector 126 outputs an electrical signal to the integrated circuit 122 corresponding to the optical Data_2 signal. The integrated circuit 122 can then decode the data signal. In some other implementations, the light detector 126 decodes the Data_2 signal and relays the decoded signal to the integrated circuit 122.

The LSOD_a signal indicates a presence or absence of an optical signal received by the optical module 120*a*, such as the Data_2 signal or an out-of-band optical signal, indicating that the fiber optic cable is connected. For example, when the optical module 120*b* shown in FIG. 1A is transmitting network data via the Data_2 signal, the Data_2 signal is detected by the light detector 126. Similarly, the light detector can also detect an out-of-band signal transmitted by the optical module 120*b*, even if no network data is transmitted. In some implementations, the light detector 126 responds by generating an appropriate LSOD_a signal. As described above, the LSOD_a signal can have a logical high value when the Data_2 signal or out-of-band signal is present. The integrated circuit 122 can determine that the LSOD_a signal should be high based on the detection of a predetermined modulation pattern of the out-of-band signal by the light detector 126. In other implementations, the integrated circuit 122 can determine that the LSOD_a signal should be high based on the duty cycle of the Data_2 signal detected by the light detector 126. For example, the integrated circuit 122 can determine that the optical link is active if the duty cycle of the Data_2 signal meets a minimum threshold. The LSOD_a signal remains at a logical high voltage as long as the Data_2 signal is detected by the light detector 126. Such detection logic prevents the light detector 126 or the integrated circuit 122 from falsely interpreting stray ambient light or light from a technician's flashlight, e.g., as a proper cable connection. In other implementations, the processor can determine that the LSOD_a signal should be high based on the strength of the Data_2 signal detected by the light detector. In other implementations, the signal detected by the light detector may also be low pass filtered, to check if, on average, there is a stream of digital signals being received by the light detector.

When the Data_2 signal or out-of-band signal is no longer detected, the LSOD_a signal generated by the integrated circuit 122 or by the light detector 126 changes to a logical low value, indicating the optical link is inactive. For example, if the fiber optic cable carrying the Data_2 signal is disconnected from the optical module 120*a*, the light detector 126 will not detect the signal. Similarly, if the fiber optic cable is disconnected from its other end (i.e., from the optical module 120*b*), the light detector 126 will also fail to detect the Data_2 signal. Thus, any disconnection of the fiber optic cable will result in a logical low voltage on the LSOD_a signal.

The logic device 112 of the controller 110*a* receives the LSOD_a signal via the input interconnect 116, and responds by outputting an appropriate LSLE_a signal on the output interconnect 114. The disconnection of the fiber optic cable may result in the eyes of an individual being exposed to harmful light, as discussed above. The logic device 112 can therefore respond to a fiber optic cable disconnection (i.e., a loss of the Data_2 signal and corresponding logical low voltage on the LSOD_a signal) in a manner that reduces the risk of harm that may be caused by light escaping due to the disconnected cable. For example, the logic device 112, can modulate the voltage on the output interconnect 114. The integrated circuit 122 will detect the modulated voltage on the LSLE_a signal and will respond by causing the light source to output light modulated at a reduced average optical power that is safe for human eyes. In some other implementations, the logic device 112 can output a logical low voltage on the voltage interconnect 114. The processor responds by turning off the light source 124 or modulating the output of the light source 124 at a low duty cycle, so that the light source 124 will not output light at dangerously high power levels while the fiber optic cable is disconnected.

Figure 1C:
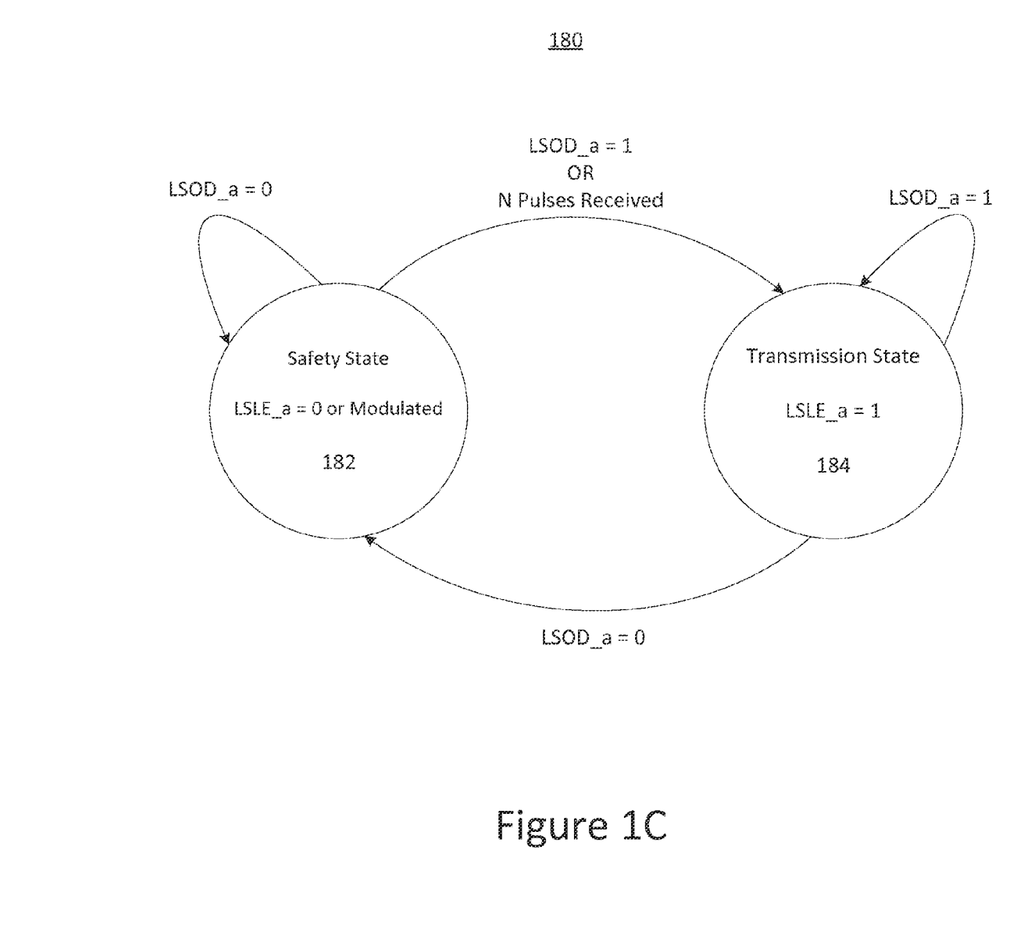
FIG. 1C is a state transition diagram implemented by the controller shown in FIG. 1B, according to an illustrative implementation.

FIG. 1C is a state transition diagram 180 implemented by the controller 110*a* shown in FIG. 1B, according to an illustrative implementation. The input to the controller 110*a* is the LSOD_a signal, which is received on the input interconnect 116. The controller responds to the input by applying an appropriate voltage to the output interconnect 114 (i.e., the LSLE_a signal). The controller starts in the "safety state" 182, in which the LSLE_a signal is logical low voltage or is modulated. The LSLE_a signal can be detected by the integrated circuit 122, which can respond by turning off the light source in response to a logical low signal or reducing the average optical power of the light source to a level safe for human eyes in response to the low or modulated LSLE_a signal. For example, the light source 124 can be controlled to output an optical signal with a relatively small pulse width and duty cycle. The controller 110*a* remains in state 182 as long as the received LSOD_a signal has a logical low value, indicating a cable disconnection. Therefore, while the fiber optic cable is disconnected and individuals are potentially exposed to light from the light source 124, the LSLE_a signal is modulated or kept at a low logical value to cause the light source 124 to emit light at a safe average optical power.

The controller 110*a* can transition to the "transmission state" 184 in response to receiving a logical high voltage on the LSOD_a signal or multiple pulses (N) with a logical high voltage on the LSOD_a signal. The high value of LSOD_a indicates that the cable connection has been restored. Therefore it is safe to increase the optical power of the light source 124, and the controller 110*a* outputs a logical high value on LSLE_a, enabling the light source 124 to operate at an increased average optical power. The controller 110*a* remains in state 184 as long as the LSOD_a signal remains high (i.e., as long as the fiber optic cable is safely connected). The controller 110*a* transitions back to the safety state 182 when the LSOD_a signal takes on a logical low value, which indicates that the cable has again been disconnected.

Figure 2A:
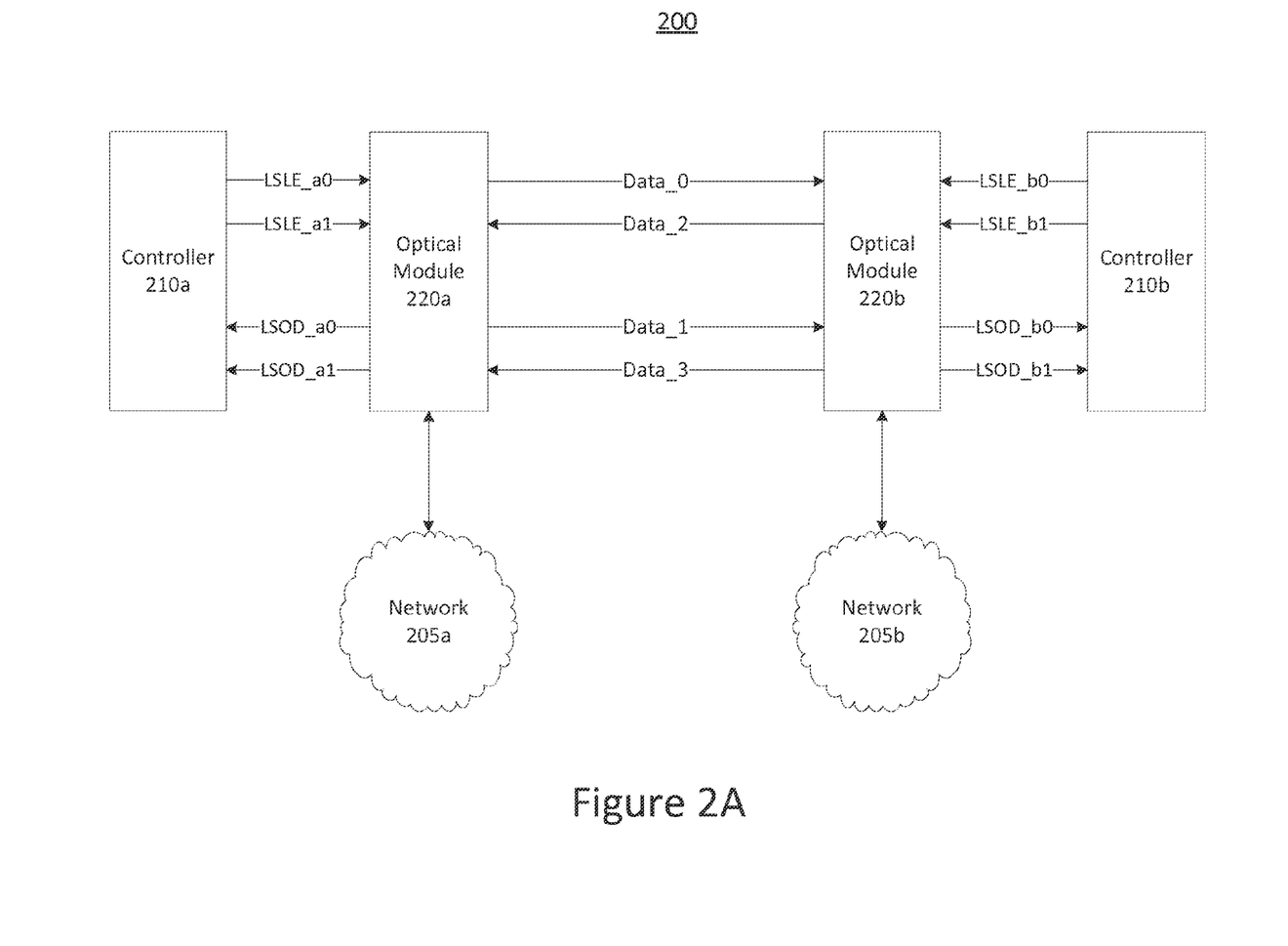
FIG. 2A is a block diagram of an alternative example optical link, according to an illustrative implementation.

FIG. 2A is a block diagram of an alternative example optical link 200, according to an illustrative implementation. The optical link 200 can be used to reduce the risk of eye damage to an individual who is exposed to light sources of the optical link 200. Relative to the optical link 100 shown in FIG. 1A, the optical link 200 includes additional failsafe features to further reduce the risk of harm potentially caused to individuals exposed to light emitted at an unsafe average optical power. For example, the optical link 200 includes two parallel transmit and receive channels, as well as a sense input for verifying signal values.

Like the optical link 100 shown in FIG. 1A, the optical link 200 can represent a communication channel of a computer network. The optical link 200 includes a first controller 210a in communication with a first optical module 220a. A second controller 210b communicates with a second optical module 220b. Network data, such as data from the networks 205a and 205b, can be exchanged between the first optical module 220a and the second optical module 220b.

The networks 205a and 205b can include computer networks such as portions of the Internet, personal, local, metro, wide or other area networks, intranets, satellite networks, and other communication networks such as voice or data mobile phone communication networks. In some implementations, the networks 205a and 205b can include servers in one or more data centers, and the optical link 200 can represent a communication channel within or between the data centers. For example, the optical modules 220a and 220b can be included in network interface cards of respective servers in the data centers or in various switches, hubs, or routers in the data centers. The optical module 220a is configured to output two optical signals, shown as "Data_0" and "Data_1" in FIG. 2A, to the optical module 220b. The optical module 220b outputs the optical signals shown as "Data_2" and "Data_3," which are received by the optical module 220a.

In some implementations, the optical signals Data_0, Data_1, Data_2, and Data_3 are transmitted over fiber optic cables connected to respective input and output ports of the optical modules 220a and 220b. In some implementations, the Data_0 and Data_2 signals are carried by a single fiber optic cable, and the Data_1 and Data_3 signals are carried by a second fiber optic cable. As discussed above, optical signals may be harmful to an individual whose eyes are exposed to the optical signal. The optical power required to reliably transmit information between the optical module 220a and 220b may be relatively high to compensate for dispersion effects and optical noise within the fiber optic cables, as well as compensate for electrical noise at the receiver. If a fiber optic cable is disconnected, individuals in the vicinity of the optical link 200 can be exposed to the light, and the high optical power of the light may cause damage to the eyes of those individuals.

To reduce the risk of eye damage, the controllers 210a and 210b can implement control algorithms that prevent their respective optical modules 220a and 220b from outputting unsafe light levels in circumstances where individuals may be potentially exposed to the light (e.g., due to a disconnected fiber optic cable). The controller 210a receives two optical detection signals, shown as LSOD_a0 and LSOD_a1, from the optical module 220a and outputs two respective enable signals, shown as LSLE_a0 and LSLE_a1, that are received by the optical module 220a. Likewise, controller 210b receives the optical detection signals LSOD_b0 and LSOD_b1 from the optical module 220b and outputs the enable signals LSLE_b0 and LSLE_b1, which is received by the optical module 220b. In some implementations, the respective LSLE and LSOD signals are digital signals whose voltages correspond to logic levels. The details of the algorithm implemented by the controllers 210a and 210b is described further below in connection with FIGS. 2B-2D.

Figure 2B:
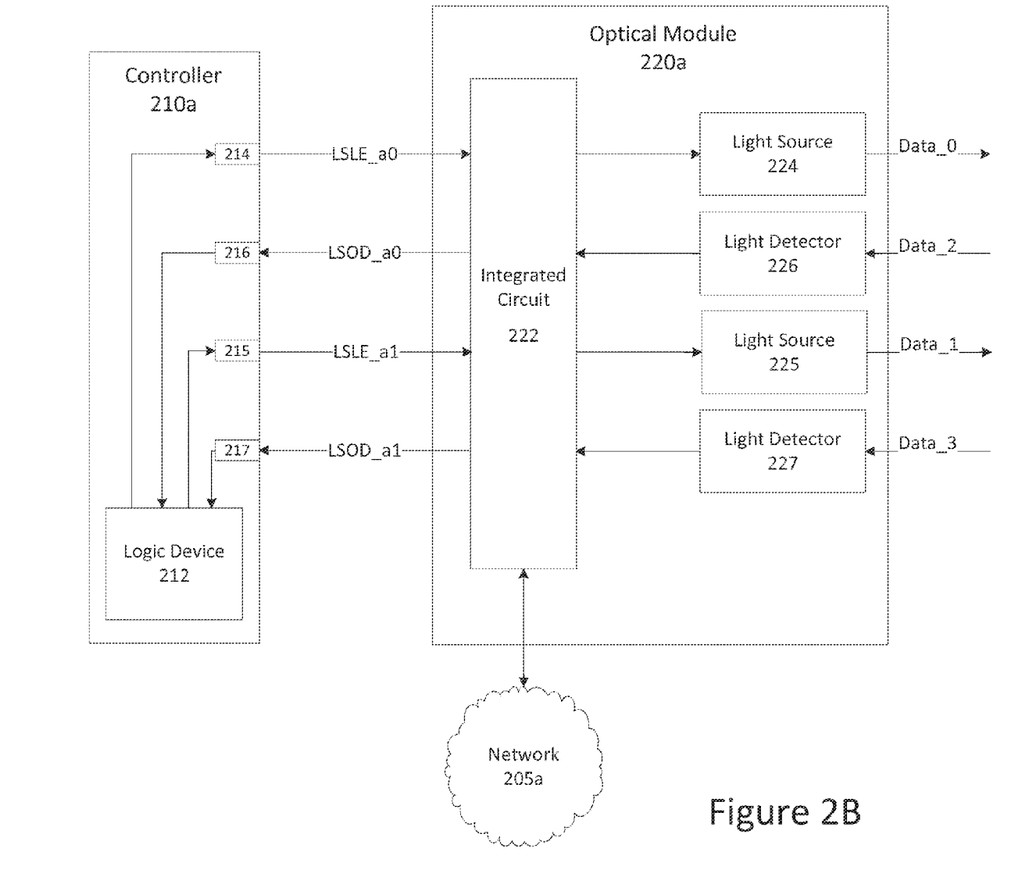
FIG. 2B is a block diagram showing a controller and an optical module of the optical link shown in FIG. 2A, according to an illustrative implementation.

FIG. 2B is a block diagram showing a controller 210a and an optical module 220a of the optical link 200 shown in FIG. 2A, according to an illustrative implementation. The controller 210a includes a logic device 212, output interconnects 214 and 215, and input interconnects 216 and 217. The logic device 212 receives the LSOD_a0 input signal from the input interconnect 216 and receives the LSOD_a1 input signal from the input interconnect 217. The logic device 212 generates a voltage corresponding to the LSLE_a0 signal and outputs the voltage on the output interconnect 214. The logic device 212 generates a voltage corresponding to the LSLE_a1 signal and outputs the voltage on the output interconnect 215.

In some implementations, the logic device 212 may be implemented as special purpose logic circuitry, FPGA or an ASIC. In other implementations, the logic device 212 may be one or more general purpose processors configured to perform the processes disclosed herein The optical module 220a includes an integrated circuit 222, light sources 224 and 225, and light detectors 226 and 227. The integrated circuit 222 can communicate with the network 205a, for example to receive network packets to be transmitted to another network node by the optical module 220a or to forward packets intended for other nodes on the network 205a. For example, the integrated circuit 222 may be included in, or may be communicatively coupled to, a NIC or any other interface device configured to transmit and receive information to and from the network 205a. The integrated circuit 222 controls the light sources 224 and 225 to output the optical Data_0 and Data_1 signals, respectively, which can be transmitted to another optical module such as the optical module 220b shown in FIG. 2A. In some implementations, the light sources 224 and 225 are lasers whose output can be controlled to correspond to the information encoded in the Data_0 and Data_1 signals. Suitable lasers include typical seminconductor lasers found in traditional fiber optic communication devices. The integrated circuit 222 controls the light sources 224 and 225 to generate the Data_0 and Data_1 signals. The light sources 224 and 225 can also include lenses or other focusing devices to collimate light. Such collimation increases the efficiency with which the optical signal is introduced into a fiber optic cable, but increases the risk to the human eye. In some implementations, the light sources 224 and 225 are capable of outputting optical signals having high average optical power that may harm an individual whose eyes are exposed to the optical signal.

The integrated circuit 222 can use the LSLE_a0 signal as an enable input for the light source 224. For example, when the LSLE_a0 signal has a logical high value, the integrated circuit 222 can control the light source 224 to transmit network data to the optical module 220b via the Data_0 signal. The Data_0 signal can correspond to network packets received from the network 205a or other network information generated by the integrated circuit 222. A high optical power may be required for successful and/or reliable transmission of network data from the optical module 220a to the optical module. Thus, when the LSLE_a signal has a logical high value, the processor can control the light source 224 to output light that may cause harm to an individual if the eye of the individual were exposed to the light.

However, when the LSLE_a0 signal has a logical low value, the integrated circuit 222 can respond by refraining from transmitting data and reducing the power output of the laser to substantially eliminate the risk of eye injury. In some implementations, the integrated circuit 222 responds by turning off the light source 224. In some other implementations, the optical power of the light source 224 can be reduced by modulating its output to have a reduced intensity or duty cycle. For example, the light source 224 can be modulated to reduce the pulse width or duty cycle of the output of the light source 224, so that the light output is safe for an individual's eyes which could be exposed to the light source output.

Similarly, the LSLE_a1 signal acts as an enable input for the light source 225. The logical high, logical low, or modulated value of the LSLE_a1 signal can cause the integrated circuit 222 to control the light source 225 accordingly. For example, a logical low or modulated value of LSLE_a1 can cause the integrated circuit 222 to disable the light source 225 or otherwise cause it to reduce its average power output. A logical high value of LSLE_a1 can cause the integrated circuit 222 to allow the light source 225 to transmit network information at a high optical power.

In some implementations, in response to receiving an LSLE_a0 or LSLE_a1 signal having a logical low value or a modulated value, the integrated circuit 222 ceases outputting data to one or both of the light sources 224 and 225.

The light detector 226 receives an optical input signal, such as the Data_2 signal generated by the optical module 220b shown in FIG. 2A. The light detector 226 can detect a presence or absence of the Data_2 signal, and transmits a signal corresponding to this presence or absence to the integrated circuit 222. For example, the light detector 226 can output a digital signal to the integrated circuit 222, with a logical high voltage indicating that the Data_2 signal is present and a logical low voltage indicating that the Data_2 signal is absent. This information can become the LSOD_a0 signal or can be used by the integrated circuit 222 to generate the LSOD_a0 signal. In some other implementations, the light detector 226 is configured to generate the LSOD_a0 signal, (or another signal used as data to inform the generator of the LSOD_a0 signal), based on the presence or absence of another out-of-band optical signal received over the optical link. For example, the out-of-band signal can be used to indicate that the optical link is still active in instances in which no data is transmitted over the optical link.

In some implementations, the light detector 226 outputs an electrical signal to the integrated circuit 222 corresponding to the optical Data_2 signal. The integrated circuit 222 can then decode the data signal. In some other implementations, the light detector 226 decodes the Data_2 signal and relays the decoded signal to the integrated circuit 222. The light detector 227 behaves in a manner similar to the light detector 226. For example, the light detector 227 receives the Data_3 signal or another out-of-band optical signal, relays the information to the integrated circuit 222, and generates (or helps to generate) the LSOD_a1 signal.

In some implementations, the LSOD_a0 and LSOD_a1 signals are generated based on a low-pass filtered version of a signal output by the light detector responsive to the received data or out-of-band signals.

The LSOD_a0 signal indicates a presence or absence of an optical signal received by the optical module 220a, such as the Data_2 signal or another out-of-band signal. For example, when the optical module 220b shown in FIG. 2A is transmitting network data via the Data_2 signal, the Data_2 signal is detected by the light detector 226. Alternatively, the light detector 226 may receive the out-of-band signal as an indication that the optical link is active but that no data is being transmitted. In some implementations, the light detector 226 responds by generating an appropriate LSOD_a0 signal. As described above, the LSOD_a0 signal can have a logical high value when the Data_2 signal is present. In other implementations, the light detector 226 transmits the network information encoded in the Data_2 signal to the integrated circuit 222, and the integrated circuit 222 generates the appropriate LSOD_a0 signal. The LSOD_a0 signal remains at a logical high voltage as long as the Data_2 signal is detected by the light detector 226.

When the Data_2 signal (or out-of-band signal) is no longer detected, the LSOD_a0 signal generated by the integrated circuit 222 or by the light detector 226 changes to a logical low value, indicating the Data_2 signal is absent. For example, if the fiber optic cable carrying the Data_2 signal is disconnected from the optical module 220a, the light detector 226 will not detect the signal. Similarly, if the fiber optic cable is disconnected from its other end (i.e., from the optical module 220b), the light detector 226 will also fail to detect the Data_2 signal. Thus, any disconnection of the fiber optic cable will result in a logical low voltage on the LSOD_a0 signal. The LSOD_a1 signal similarly is used to indicate a presence or absence of the Data_3 signal. A logical low value for LSOD_a1 indicates that the Data_3 signal is absent, for example due to a disconnection of the fiber optic cable carrying the Data_3 signal.

In some implementations, the light sources 224 and 225 are used to transmit identical network traffic in parallel with each other. This redundancy can help to avoid single points of failure in that can be present in systems without redundancy, such as the optical link 100 shown in FIG. 1A. The optical module 220b can be used in the same manner, such that the signals Data_2 and Data_3 received by the light detectors 226 and 227, respectively, are intended to be identical copies. In some implementations, the parallel data signals can be achieved in a single fiber optic cable, for example by using wavelength division multiplexing. In other implementations, separate cables can be used (e.g., one cable for Data_0 and Data_2, and one cable for Data_1 and Data_3).

As in the example of FIGS. 1A-1C, the logic device 212 can respond to a fiber optic cable disconnection (i.e., a loss of the Data_2 or Data_3 signal and corresponding logical low voltage on the LSOD_a0 or LSOD_a1 signal, which is applied on the input interconnects 216 and 217, respectively) in a manner that reduces the risk of harm that may be caused by light escaping due to the disconnected cable. By using redundant parallel channels, the logic device 212 is able to eliminate single points of failure that are present in the optical link of FIG. 1A. For example, without redundant parallel channels (i.e., without the channels carrying the Data_1 and Data_3 optical signals), one single point of failure can occur when the LSOD_a0 signal becomes "stuck" at a logical high value. The LSOD_a0 signal is considered "stuck" when the voltage applied to the input interconnect 217 is a logical high voltage when the integrated circuit 222 is generating a logical low voltage for LSOD_a0. If this type of failure occurs, the logic device 212 may erroneously determine that the fiber optic cable is connected. As a result, LSLE_a0 will remain high, potentially allowing light to harm an individual while the cable is disconnected. Including parallel channels carrying the Data_1 and Data_3 signals, along with a parallel detection signal (i.e., LSOD_a1), can prevent such a failure. For example, the logic device 212 can determine the state of the LSOD_a0 and LSOD_a1 signals by measuring the voltages on the input interconnects 216 and 217. The logic device can then determine whether one of the LSOD_a0 or LSOD_a1 signals is "stuck" in a logical high state by determining by whether the LSOD_a0 and LSOD_a1 signals have identical values. Because the Data_2 and Data_3 signals received by the optical module 220a are identical, the LSOD_a0 and LSOD_a1 signals generated by the integrated circuit 222 should also be identical under normal operating conditions. Therefore, if these signals do not match, the logic device 212 can determine that one of the signals is "stuck" at a logical high voltage. To ensure that such a failure does not result in harm to an individual in the vicinity of a potentially disconnected optical cable, the logic device 212 can output logical high voltages on output interconnects 214 and 216 (corresponding to LSLE_a0 and LSLE_a1) only if LSOD_a0 and LSOD_a1 are both logical high, because a mismatch would indicate a stuck pin.

Figure 2C:
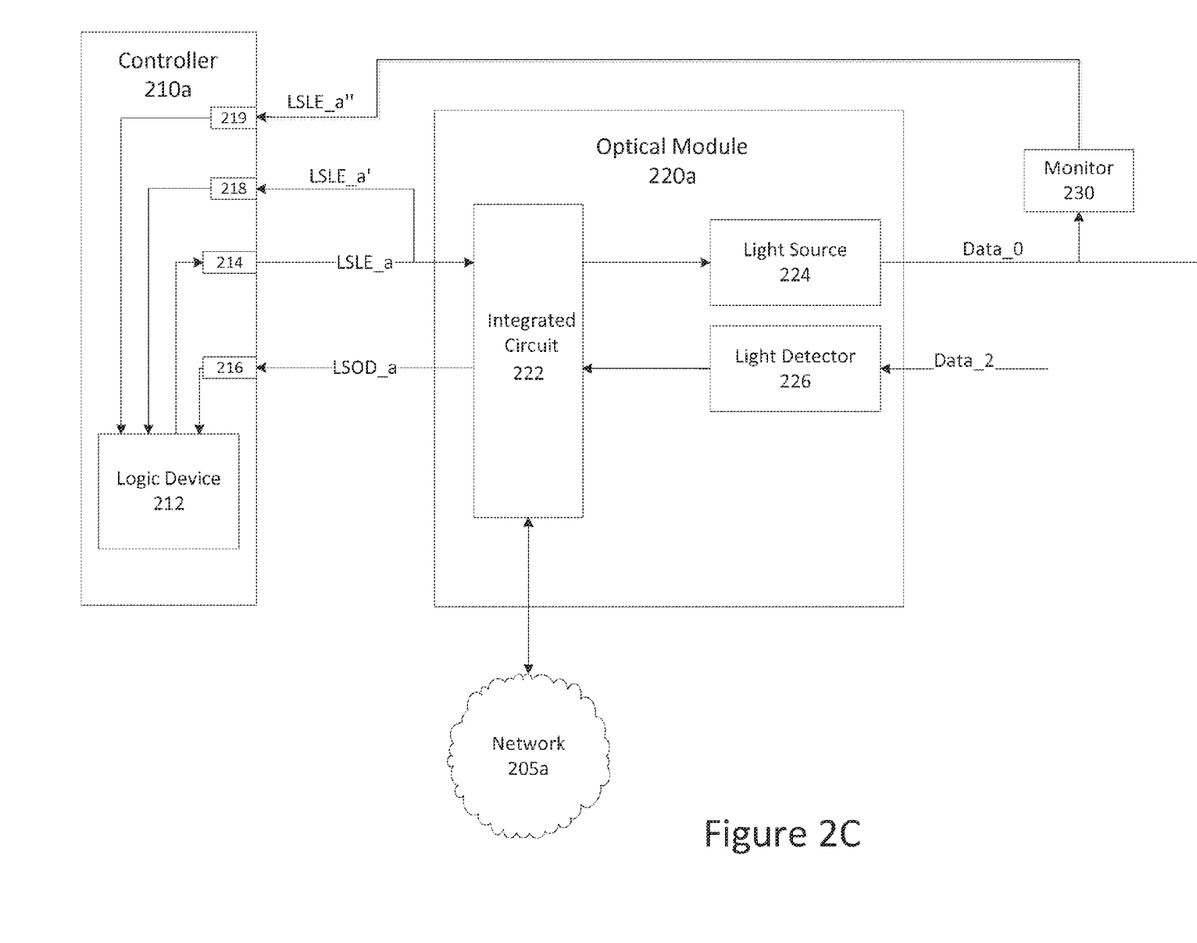
FIG. 2C is a block diagram showing an alternative configuration for a controller and an optical module of the optical link shown in FIG. 2A, according to an illustrative implementation.

FIG. 2C is a block diagram showing an alternative configuration for the controller 210 and the optical module 220a of the optical link shown in FIG. 2A, according to an illustrative implementation. The optical module 220a includes the integrated circuit 222, the light source 224, and the light detector 226, but does not include the additional redundant parallel optical link shown in FIG. 2B and its associated components, such as the light source 225 and the light detector 227. The controller 210a includes the logic device 212 as well as input interconnects 216, 218, and 219 and an output interconnect 214. The logic device 212, integrated circuit 222, light source 224, and light detector 226 shown in FIG. 2C perform the same functions as described above in connection with FIG. 2B.

Also shown in FIG. 2C is an electrical connection formed between the input interconnect 218 and the input to the optical module 220a that receives the LSLE_a input from the output interconnect 214. The signal carried by this electrical connection is labeled LSLE_a'. A signal monitor 230 receives the Data_0 signal as an input and generates the LSLE_a" signal as an output, which is received by the controller 210 at the input interconnect 219. The addition of the LSLEa' and LSLE_a" signals can eliminate a second single point of failure present in the optical link 100 shown in FIGS. 1A and 1B.

For example, a second single point of failure occurs when the LSLE_a input is erroneously "stuck" at a logical high voltage. This failure condition is dangerous because it will cause the light source 224 to continue to output unsafe levels of light even if the fiber optic cable is disconnected. By measuring the LSLE_a input to the optical module 220 and/or measuring the optical signal Data_0, the logic device can determine whether this failure has occurred. To measure the LSLE_a signal, an electrical connection is formed between the input interconnect 218 and the input to the optical module 220a that receives the LSLE_a input from the output interconnect 214. In some implementations, the logic device 212 compares the voltage output on the output interconnect 214 to the voltage received at the input interconnect 218. If the controller 210 and the optical module 220a are operating correctly, these signals should be substantially the same, because the voltage applied to the output interconnect 214 is not modified before being received as LSLE_a' on the input interconnect 218. However, in some circumstances, these voltages may not match. For example, the LSLE_a input to the optical module 220a may accidentally come into contact with another electrical component of the system, which could cause erroneous voltages on the LSLE_a input to the optical module 220a. Therefore, if the voltages on the output interconnect 214 and the input interconnect 218 do not match, the logic device 212 determines that a failure condition has occurred, and controls the integrated circuit 222 to turn off the light source 224, thereby preventing harm to individuals whose eyes may be exposed to the light output.

Alternatively, or additionally, the logic device 212 may determine the LSLE_a signal is "stuck" at a logical high voltage by using the output from the monitor 230. The monitor 230 can receive the optical output of the light source 224, and can generate that LSLE_a" signal in response. For example, the LSLE_a" signal can be a digital voltage indicating a presence or absence of the Data_0 signal or another out-of-band signal. A logical high value of LSLE_a" can indicate that the Data_0 signal or out of band signal is present. In some implementations, the monitor 230 detects the output of the light source 224 without substantially altering the signal. For example, the Data_0 signal may be carried to the monitor 230 by a different fiber than is used to transmit the Data_0 signal to the optical module 220b shown in FIG. 2A.

The logic device 212 compares the voltage output on the output interconnect 214 to the voltage received at the input interconnect 219. If the controller 210 and the optical module 220a are operating correctly, these signals should be substantially the same. For example, the monitor 230 should only detect a signal from the light source 224 and output a logical high voltage when the LSLE_a output is also high to enable the light source 224. However, as discussed above, these voltages may not match in some circumstances when the LSLE_a signal becomes "stuck" at a high voltage. Therefore, if the voltages on the output interconnect 214 and the input interconnect 219 do not match, the logic device 212 determines that a failure condition has occurred, and controls the integrated circuit 222 to turn of the light source 224, thereby preventing harm to individuals whose eyes may be exposed to the light output.

In some implementations, the enable feedback configuration shown in FIG. 2C can be used in conjunction with the parallel channels shown in FIG. 2B. For example, the logic device 212 could receive feedback inputs from both the LSLE_a0 and LSLE_a1 signals, and could use the feedback signals to determine whether one of the LSLE signals is "stuck" at a logical high voltage. In some implementations, the integrated circuit 222 can turn off both light sources 224 and 225 in response to a determination by the logic device 212 that either LSLE_a0 or LSLE_a1 is "stuck."

Figure 2D:
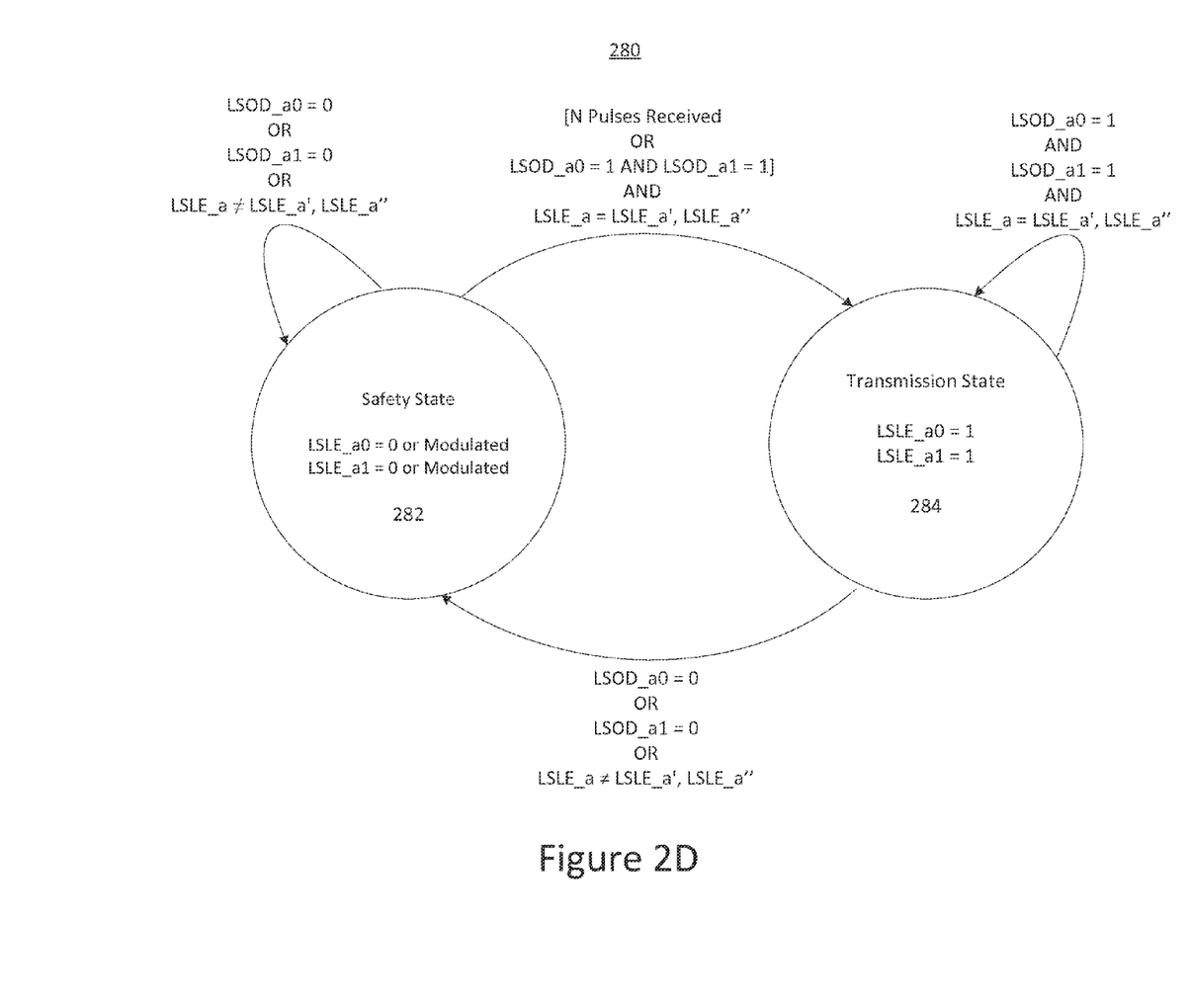
FIG. 2D is a state transition diagram implemented by the controller shown in FIG. 2B, according to an illustrative implementation.

FIG. 2D is a state transition diagram 280 implemented by the controller 210a shown in FIG. 2B, according to an illustrative implementation. The input to the controller 210a are the LSOD_a0, LSOD_a1, LSLE_a', and LSLE_a" signals, which are received on the input interconnects 216, 217, 218, and 219, respectively. The controller responds to the input by applying appropriate voltages to the output interconnects 214 and 215 (i.e., the LSLE_a0 and LSLE_a1 signals). The enable signals are intended to be redundant, so the controller always outputs the same value on both output interconnects 214 and 215.

The controller starts in the "safety state" 282, in which the LSLE_a0 and LSLE_a1 signals are either logical low voltages or modulated. The LSLE_a0 and LSLE_a1 signals can be detected by the integrated circuit 222, which can respond by turning off the respective light source in response to a logical low signal or reducing the average optical power of the respective light source to a level safe for human eyes in response to a modulation pattern. For example, light sources 224 and 225 can be controlled to output optical signals with relatively small pulse widths and duty cycles to reduce their average optical power. The controller 210a remains in state 282 as long as the either of the received LSOD_a0 and LSOD_a1 signals has a logical low value, indicating a cable disconnection, or if there is a mismatch between the LSLE_a, LSLE_a', and LSLE_a" signals, indicating a "stuck" enable pin. Therefore, while the fiber optic cable is disconnected or an enable pin is "stuck" at a logical high value, the LSLE_a0 and LSLE_a1 signals are maintained either at logical low values to turn the light sources 224 and 225 off, or are modulated to cause the light sources 224 and 225 to emit light at a safe average optical power.

The controller 210a transitions to the "transmission state" 284 in response to receiving a logical high voltage (or pulses of high voltages) on both the LSOD_a0 and LSOD_a1 signals, as well as a match between the LSLE_a, LSLE_a', and LSLE_a" signals. The high values of LSOD_a0 and LSOD_a1 indicate that the cable connection has been restored and the match between the LSLE_a, LSLE_a', and LSLE_a" signals indicates that there is not a "stuck" enable pin. Therefore it is safe to increase the optical power of the light sources 224 and 225, and the controller 210a outputs a logical high value on LSLE_a0 and LSLE_a1, enabling the light sources 224 and 225 to operate at an increased average optical power. The controller 210a remains in state 284 as long as the LSOD_a0 and LSOD_a1 signals remain high (i.e., as long as the fiber optic cable is safely connected) and the values of LSLE_a, LSLE_a', and LSLE_a" are matching. The controller 210a transitions back to the "safety state" 282 when either of the LSOD_a0 or LSOD_a1 signals takes on a logical low value, which indicates that the cable has again been disconnected, or when there is a mismatch between the logical values of LSLE_a, LSLE_a', and LSLE_a", indicating a "stuck" pin.

Figure 3:
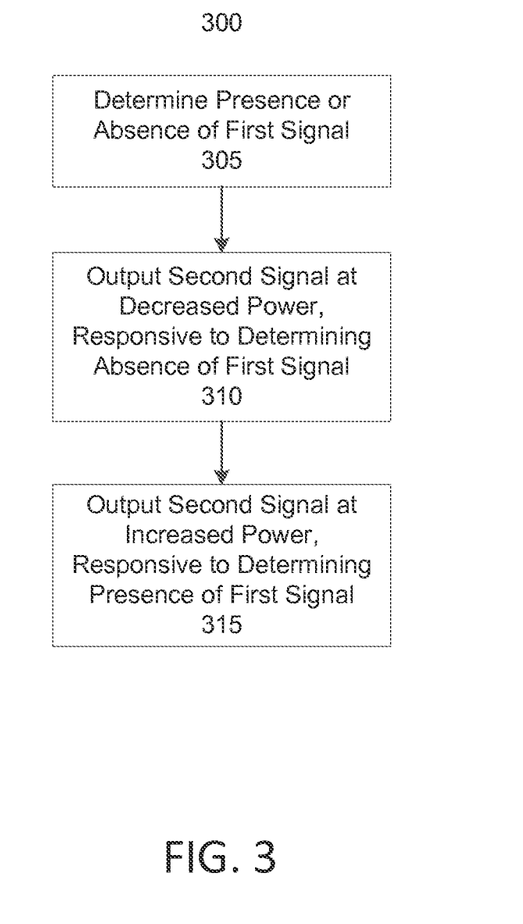
FIG. 3 is a flow diagram of a process for operating an optical transceiver, according to an illustrative implementation.

FIG. 3 is a flow diagram of a process 300 for operating an optical transceiver, according to an illustrative implementation. The process 300 is similar to the algorithm implemented by the controller 110a shown in FIG. 1B. The process 300 includes determining a presence or absence of a first signal (stage 305). In some implementations, the first signal is an optical signal received from another optical transceiver. A light detector can be used to determine the presence or absence of the first signal. In some implementations, the optical signal is a data signal output by another transceiver. In some other implementations, the optical signal is an out-of-band signal output by the other transceiver. The out-of-band signal can be transmitted even when data is not actively being transmitted by the transceiver, thereby avoiding the receiving transceiver from mistakenly detecting a false disconnection when traffic rates slow. In some implementations, the light detector can output a signal indicative of the presence or absence of the first signal. The absence of the first signal can indicate that a fiber optic cable carrying the first signal has been disconnected from at least one end of the communication link.

The process 300 includes outputting a second signal at a decreased power, responsive to determining an absence of the first signal (stage 310). In some implementations, the second signal is an optical signal and the decreased power is an average optical power that is not harmful to the eyes of a human observer. Thus, the decreased optical power can be used for the second signal when the first signal is determined to be absent, indicating a possible cable disconnection. In some implementations, it can be advantageous to output an optical signal having decreased average optical power instead of turning off the light source. For example, the low power signal can allow a receiving optical module to determine when the connection has been restored. If no signal were output, the receiving optical module would not be able to determine that the connection is restored. Because a disconnected cable leaves light from the optical transceiver exposed, it can be desirable to transmit a signal at a decreased power while the cable is disconnected, in order to protect the eyes of individuals who may be exposed to the light. The signal can be transmitted at a decreased power by reducing the intensity and/or the duty cycle of the optical signal.

The process 300 includes outputting the second signal at an increased power, responsive to determining a presence of the first signal (stage 315). In some implementations, the first signal is detected by monitoring the direct output of a light detector. In some other implementations, the first signal is detected by measuring a low-pass filtered version of the light detector output. In some other implementations, the first signal is detected by detecting a configurable modulation pattern in the light detector output corresponding to a modulation pattern known to be implemented by a transceiver when operating in a safe mode.

The increased power may be an optical power that would be harmful to the eyes of a human observer. However, if the first signal is determined to be present, then the cable carrying the signal is connected to the transceiver and the optical signal will not be exposed. An increased optical power can therefore be used safely. In some implementations, the increased optical power may be selected based on a desired signal quality for a communication link. For example, the optical transceiver may output a signal having an optical power sufficiently high to overcome optical noise within the link.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical transceiver, comprising:
    an optical module configured to output a first optical signal;
    a first photodetector configured to output a signal indicative of a presence or absence of a second optical signal;
    a second photodetector configured to output a signal indicative of a presence or absence of a third optical signal; and
    a controller coupled to the optical module and the first photodetector, and configured to control the output of the optical module, wherein:
        in response to a determination by the controller that an output of the first photodetector indicates the second optical signal is absent, the controller controls the optical module to output the first signal at a decreased average optical power;
        in response to a determination by the controller that the output of the first photodetector indicates the second optical signal is present, the controller controls the optical module to output the first optical signal at an increased average optical power; and
        in response to a determination of a mismatch between the outputs of the first photodetector and the second photodetector, the controller controls the optical module to output the first optical signal at the decreased average optical power.

2. The optical transceiver of claim 1, wherein the optical module includes a laser for generating the first optical signal.

3. The optical transceiver of claim 2, further comprising a lens coupled to the laser and configured to collimate light output by the laser.

4. The optical transceiver of claim 1, wherein the decreased average optical power is sufficiently low to be substantially harmless to the eye of a human observer.

5. The optical transceiver of claim 1, wherein the controller is further configured to:
    control the optical module to output the first signal at the decreased average optical power by applying a logical low voltage on a first output pin of the controller coupled to the optical module; and
    control the optical module to output the first signal at the increased average optical power by applying a logical high voltage on the first output pin of the controller coupled to the optical module.

6. The optical transceiver of claim 5, wherein the controller is further configured to:
    determine a match or mismatch between the voltage applied to the first output pin of the controller and a voltage received from the controller by the optical module; and
    control the optical module to output the first optical signal at the decreased average optical power, responsive to determining a mismatch.

7. The optical transceiver of claim 5, wherein the controller is further configured to:
    control the optical module to output the first optical signal at the decreased average optical power, responsive to determining that the output of the first photodetector indicates the second optical signal is present and that the voltage applied to the first output pin is a logical low voltage.

8. A method for operating an optical transceiver, the method comprising:
    outputting, by a photodetector of the optical transceiver, a signal indicative of a presence or absence of a first optical signal;
    outputting, by the optical transceiver, a second optical signal at a decreased average optical power, responsive to a determination that the first optical signal is absent;
    outputting, by the optical transceiver, the second optical signal at an increased average optical power, responsive to a determination that the first optical signal is present;
    determining, by the optical transceiver, a presence or absence of a third optical signal;

determining, by the optical transceiver, a match or mismatch between the first optical signal and the third optical signal; and outputting, by the optical transceiver, the second optical signal at the decreased average optical power, responsive to determining a mismatch.

9. The method of claim 8, wherein outputting the second optical signal at a decreased average optical power comprises outputting the second optical signal such that the second optical signal is substantially harmless to the eye of a human observer.

10. The method of claim 8, further comprising:
applying, by a controller of the optical transceiver, a logical low voltage on a first output pin coupled to an optical module of the optical transceiver to control the optical module to output the second optical signal at the decreased average optical power; and
applying, by the controller of the optical transceiver, a logical high voltage on the first output pin coupled to the optical module of the optical transceiver to control the optical module to output the second optical signal at the increased average optical power.

11. The method of claim 9, further comprising:
determining, by the controller, a match or mismatch between the voltage applied on the first output pin and the voltage received from the controller by the optical module; and
controlling, by the controller, the optical module to output the second optical signal at the decreased average optical power, responsive to determining a mismatch.

12. An optical transceiver, comprising:
a light outputting means for outputting a first optical signal;
a first light detecting means for outputting a signal indicative of a presence or absence of a second optical signal;
a second light detecting means for outputting a signal indicative of a presence or absence of a third optical signal;
a signal analyzing means for analyzing the signal output by the light detecting means; and
a signal controlling means configured to:
control the light outputting means to output the first optical signal at a decreased average optical power, responsive to a determination by the signal analyzing means that the output of the light detecting means indicates the second optical signal is absent;
control the light outputting means to output the first optical signal at an increased average optical power, responsive to a determination by the signal analyzing means that the output of the light detecting means indicates the second optical signal is present;
control the light outputting means to output the first optical signal at the decreased average optical power, responsive to a determination of a mismatch between the outputs of the first light detecting means and the second light detecting means.

13. The optical transceiver of claim 12, further comprising a focusing means optically coupled to the light outputting means to collimate light forming the first optical signal.

14. The optical transceiver of claim 12, wherein the signal controlling means is further configured to:
control the light outputting means to output the first optical signal at the decreased average optical power by applying a logical low voltage on a first output pin coupled to the light outputting means; and
control the light outputting means to output the first optical signal at the increased average optical power by applying a logical high voltage on a first output pin coupled to the light outputting means.

15. The optical transceiver of claim 12, wherein the signal controlling means is further configured to:
determine a match or mismatch between the voltage applied to the first output and a voltage received from the controlling means by the light outputting means; and
control the light outputting means to output the first optical signal at the decreased average optical power, responsive to determining a mismatch.

16. An optical transceiver, comprising:
an optical module configured to output a first optical signal;
a first photodetector configured to output a signal indicative of a presence or absence of a second optical signal matching a previously provided pattern; and
a controller coupled to the optical module and the first photodetector, and configured to control the output of the optical module, wherein:
in response to a determination by the controller that an output of the first photodetector indicates the second optical signal is absent, the controller controls the optical module to output the first signal at a decreased average optical power,
in response to a determination by the controller that the output of the first photodetector indicates the second optical signal is present, the controller controls the optical module to output the first optical signal at an increased average optical power, and
the controller is further configured to:
determine a match or mismatch between a voltage applied to a first output pin of the controller coupled to the optical module and a voltage received from the controller by the optical module; and
control the optical module to output the first optical signal at the decreased average optical power, responsive to determining a mismatch.

17. The optical transceiver of claim 16, wherein the optical module includes a laser for generating the first optical signal.

18. The optical transceiver of claim 17, further comprising a lens coupled to the laser and configured to collimate light output by the laser.

19. The optical transceiver of claim 16, wherein the decreased average optical power is sufficiently low to be substantially harmless to the eye of a human observer.

20. The optical transceiver of claim 16, wherein the controller is further configured to:
control the optical module to output the first signal at the decreased average optical power by applying a logical low voltage on the first output pin of the controller coupled to the optical module; and
control the optical module to output the first signal at the increased average optical power by applying a logical high voltage on the first output pin of the controller coupled to the optical module.

21. The optical transceiver of claim 20, wherein the controller is further configured to:
control the optical module to output the first optical signal at the decreased average optical power, responsive to determining that the output of the first photodetector indicates the second optical signal is present and that the voltage applied to the first output pin is a logical low voltage.

22. A method for operating an optical transceiver, the method comprising:
outputting, by a photodetector of the optical transceiver, a signal indicative of a presence or absence of a first optical signal matching a previously provided pattern;
outputting, by the optical transceiver, a second optical signal at a decreased average optical power, responsive to a determination that the first optical signal is absent; and outputting, by the optical transceiver, the second optical signal at an increased average optical power, responsive to a determination that the first optical signal is present;

determining, by the controller, a match or mismatch between the voltage applied on a first output pin coupled to an optical module of the optical transceiver and a voltage received from the controller by the optical module of the optical transceiver; and controlling, by the controller, the optical module to output the second optical signal at the decreased average optical power, responsive to determining a mismatch.

23. The method of claim 22, wherein outputting the second optical signal at a decreased average optical power comprises outputting the second optical signal such that the second optical signal is substantially harmless to the eye of a human observer.

24. The method of claim 22, further comprising:

applying, by a controller of the optical transceiver, a logical low voltage on the first output pin coupled to the optical module of the optical transceiver to control the optical module to output the second optical signal at the decreased average optical power; and applying, by the controller of the optical transceiver, a logical high voltage on the first output pin coupled to the optical module of the optical transceiver to control the optical module to output the second optical signal at the increased average optical power.

25. An optical transceiver, comprising:

a light outputting means for outputting a first optical signal;

a light detecting means for outputting a signal indicative of a presence or absence of a second optical signal matching a previously provided pattern;

a signal analyzing means for analyzing the signal output by the light detecting means; and a signal controlling means configured to:

control the light outputting means to output the first optical signal at a decreased average optical power, responsive to a determination by the signal analyzing means that the output of the light detecting means indicates the second optical signal is absent;

control the light outputting means to output the first optical signal at an increased average optical power, responsive to a determination by the signal analyzing means that the output of the light detecting means indicates the second optical signal is present;

determine a match or mismatch between a voltage applied to a first output pin coupled to the light outputting means and a voltage received from the controlling means by the light outputting means; and control the light outputting means to output the first optical signal at the decreased average optical power, responsive to determining a mismatch.

26. The optical transceiver of claim 25, further comprising a focusing means optically coupled to the light outputting means to collimate light forming the first optical signal.

27. The optical transceiver of claim 25, wherein the signal controlling means is further configured to:

control the light outputting means to output the first optical signal at the decreased average optical power by applying a logical low voltage on the first output pin coupled to the light outputting means; and control the light outputting means to output the first optical signal at the increased average optical power by applying a logical high voltage on the first output pin coupled to the light outputting means.

* * * * *